United States Patent [19]

Marvin et al.

[11] 4,275,557
[45] Jun. 30, 1981

[54] METHOD AND APPARATUS FOR CONTROLLING THRUST IN A GAS TURBINE ENGINE

[75] Inventors: Ira E. Marvin, Fairfield; Joseph R. Cowgill, Cincinnati, both of Ohio

[73] Assignee: General Electric Company, Cincinnati, Ohio

[21] Appl. No.: 872,125

[22] Filed: Jan. 25, 1978

[51] Int. Cl.³ .............................................. F02C 9/08
[52] U.S. Cl. ............................... 60/39.03; 60/39.28 R
[58] Field of Search ............... 60/39.28 R, 243, 39.03

[56] References Cited

U.S. PATENT DOCUMENTS

| 3,314,233 | 4/1967 | Urban | 60/39.28 R |
|---|---|---|---|
| 3,316,713 | 5/1967 | Urban | 60/39.28 R |
| 3,797,233 | 3/1974 | Webb et al. | 60/39.28 R |
| 3,832,846 | 9/1974 | Leeson | 60/39.28 R |
| 3,902,315 | 9/1975 | Martin | 60/39.28 R |
| 3,928,962 | 12/1975 | Maker | 60/39.28 R |
| 3,936,226 | 2/1976 | Harner et al. | 60/39.28 R |
| 4,060,980 | 12/1977 | Elsaesser et al. | 60/39.28 R |

FOREIGN PATENT DOCUMENTS 1356275 6/1974 United Kingdom .
1411712 10/1975 United Kingdom .
1463708 2/1977 United Kingdom .

OTHER PUBLICATIONS

Sobey et al., "Control of Aircraft and Missile Powerplants", John Wiley & Sons, 1963, pp. 32–35.

Primary Examiner—Robert E. Garrett
Attorney, Agent, or Firm—Robert C. Lampe, Jr.; Carl L. Silverman; Derek P. Lawrence

[57] ABSTRACT

Gas turbine engine thrust is controlled by automatically adjusting compressor rotational speed with novel functions of engine inlet temperature to hold thrust to rated values for varying engine inlet temperature conditions. Furthermore, compressor rotational speed is automatically adjusted as a function of inlet pressure to provide a thrust rating schedule which varies with altitude. Compressor corrected rotational speed is limited through a novel function of engine inlet temerature to protect against turbine overtemperature when the engine inlet temperature exceeds the flat thrust rating point.

12 Claims, 1 Drawing Figure

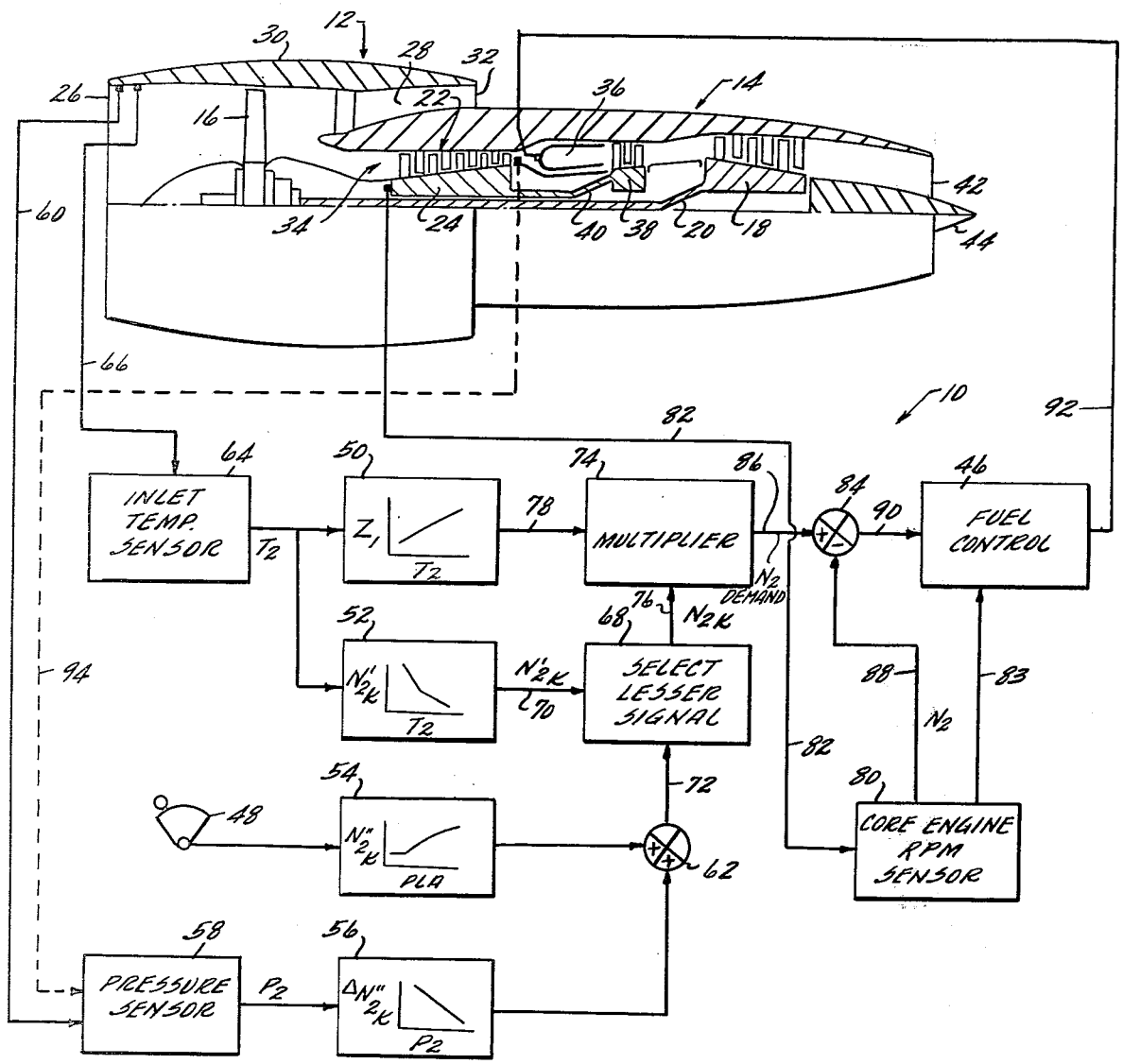

METHOD AND APPARATUS FOR CONTROLLING THRUST IN A GAS TURBINE ENGINE

BACKGROUND OF THE INVENTION

This invention relates generally to gas turbine engines and, more particularly, to apparatus for controlling thrust in engines of the gas turbofan variety.

Aircraft manufacturers and operators have expressed a strong interest in a full throttle control for gas turbine engine power plants, a control in which takeoff power, for example, is associated with the same throttle position regardless of altitude and ambient temperature. Presently, power management control for large high bypass turbofan engines is not an easy task for the pilot since takeoff power, for example, is reached at varying throttle positions depending primarily upon the ambient air temperature, and also aircraft Mach number and altitude.

In practice, gas turbine engines are characterized as possessing a given flat thrust rating. By this it is meant that the engine manufacturer gurantees that the engine will produce a given amount of thrust (called a "rated thrust") over a range of ambient inlet temperatures up to a maximum flat thrust rating point provided, of course, that fan speed or engine pressure ratio is set by the pilot to rated values supplied by rating charts available in the cockpit. When the engine inlet temperature exceeds this predetermined flat thrust rating point, thrust must be reduced in order to protect against turbine overtemperature since, with a given thrust, turbine inlet temperature increases with ambient engine inlet temperature. In fact, the power sensitivity of the engine to throttle position is highly variable depending upon the inlet air temperature to the engine. For example, on a hot day the pilot typcially advances the throttle to its maximum angular position in order to obtain rated takeoff thrust. On a cold day, it is probable that in order to obtain the same value of rated takeoff thrust the power lever would only have to be advanced half as far, and any further throttle advance could result in excessive engine corrected rotational speed and potential overstress of engine components. Thus, the power lever position must be managed manually by the pilot to obtain a given engine thrust level as environmental conditions change in order not to overstress these engine components. The problem is compounded by changes in airport altitude since the engine thrust potential of a gas turbine engine tends to decline in direct proportion to the density of the atmosphere. It would be desirable from the pilot's point of view for particular engine power ratings to be located at fixed positions on the power lever angle scale regardless of changes in inlet temperature, altitude and aircraft Mach number in order to reduce the pilot's workload which currently requires these frequent throttle adjustments.

Past efforts at providing a solution to this problem for gas turbine engines of the high bypass turbofan variety have utilized electrical trimmer controls which receive an input signal proportional to corrected fan rotational speed. Before discussing the shortcomings of the prior art approaches, it appears appropriate at this point to discuss the difference between the physical rotational speed of turbomachinery and corrected rotational speed since both terms will be utilized in the following discussions and claims. Physical rotational speed is the absolute speed of rotation with which most people are familiar, a rotational velocity usually expressed in, for example, feet per second (or meters per second) with respect to a stationary reference frame. Corrected speed is a mathematical representation of turbomachinery performance which is used for correlation purposes, a representation which relates the effects of speed variations and the effects of temperature variations on turbomachinery performance. In other words, a turbomachine's corrected speed, rather than its physical speed, is the indicator of its performance. This corrected speed is defined as being equal to the physical speed divided by a factor representing the variation in temperature from standard day conditions. Expressed as an equation, corrected speed has traditionally been defined as follows:

$$N_K = \frac{N}{\sqrt{\theta}}, \text{ where} \qquad \text{Equation 1}$$

$N_K$ = corrected speed,
$N$ = physical speed, and
$\theta = \dfrac{\text{engine inlet temperature } (T_2), °R}{518.7}$.

The prior art electrical trimmer controls using corrected fan speed have solved the problem, but at relatively high cost and at some sacrifice in engine reliability. Furthermore, although corrected fan speed by itself is an accurate indicator of thrust in a gas turbofan engine when the engine is operating at a stabilized condition, it is not particularly useful during the starting and acceleration of the engine due to the high inertia of the fan and, therefore, rotational acceleration lag with respect to the independently driven core engine. Thus, during starting and acceleration, core engine speed is the more useful parameter and, when selected as a thrust parameter, it allows for the design of a simple, low cost, reliable gas turbine engine thrust control. However, until the present invention, the economic advantages of utilizing core engine speed instead of fan speed as a thrust indicator could not compensate for the deficiencies in the correlation between thrust and corrected core speed for a gas turbofan engine. The reasons are that core engine speed was corrected to the core compressor inlet temperature (i.e., the numerator of the above $\theta$ correction factor was core compressor inlet temperature rather than engine inlet temperature) and the square root power of $\theta$ did not adequately correlate corrected speed (RPM) with flat-rated thrust. Also, water ingestion in the form of rain can disrupt such a correlation since some of the temperature rise associated with the fan is utilized in turning the ingested water to steam and the measured temperature at the core engine inlet is not indicative of the work done by the fan. Since core engine speed is necessary for engine starting and transient control, and since it can be correlated with fan speed during steady-state operation, a simple and less expensive core engine speed control can be developed in lieu of a fan speed control which provides most of the operational advantages of a fan speed control at lower cost.

SUMMARY OF THE INVENTION

Accordingly, it is the primary object of the present invention to provide apparatus for managing engine power so that takeoff thrust always occurs near the full-throttle position.

It is a further object of the present invention to configure such an apparatus so that other power ratings are also located at approximately fixed positions on the power lever angle scale irrespective of changes in engine inlet temperature, altitude and Mach number.

It is a further object of the present invention to automatically adjust core engine rotational speed with novel functions of engine inlet temperature to hold engine thrust relatively constant for all engine inlet temperatures in the flat-rated thrust region.

It is another object of the present invention to automatically adjust core engine rotational speed as a function of engine inlet pressure within limits imposed for turbine temperature protection to provide a thrust rating schedule which varies in a predetermined fashion with altitude.

It is still another object of the present invention to provide such an apparatus in which core engine speed corrected to engine inlet temperature is used to protect against turbine overtemperature when the engine inlet temperature exceeds the flat thrust rating point.

It is yet another object of the present invention to minimize the effect of water ingestion on engine thrust by correcting core engine speed to engine inlet temperature rather than core compressor inlet temperature.

Further, it is an object of the present invention to provide an improved method for controlling gas turbine engine thrust for varying values of inlet pressure and temperature.

These and other objects and advantages will be more clearly understood from the following detailed description, drawings and specific examples, all of which are intended to be typical of rather than in any way limiting to the scope of the present invention.

Briefly stated, the above objectives are accomplished in one embodiment of the present invention by an apparatus in which certain engine operating parameters are sensed and applied to schedule core engine corrected speed in a unique fashion. Corrected speed as defined in this invention is expressed by the following relationship:

$$N_K = \frac{N}{\theta^n} \qquad \text{Equation 2}$$

where, instead of being the traditional square root function of $\theta$, n is calculated for each particular engine type and each engine inlet temperature as that exponent which provides flat rated thrust for engine inlet temperatures lower than the flat-rating temperature ($T_2$). The apparatus establishes a demand corrected core engine speed as a function of power lever angle based on known operating characteristics of the engine and biases this demand corrected speed with a unique function of engine inlet pressure to provide a demand corrected speed with altitude compensation. Thus, the apparatus holds the thrust essentially constant (as called for by the PLA) at all engine inlet temperatures below the rated inlet temperature, except as biased for altitude compensation. Above this temperature, the apparatus produces a demand core engine corrected speed inversely proportional to engine inlet temperature which results in engine thrust being reduced in an inverse relationship with temperature so as not to exceed the maximum rated turbine inlet temperature. The apparatus operates utilizing a novel core engine corrected speed with a correction factor based on a known mathematical model of the engine to relate demand corrected speed to demand physical speed which is compared to the sensed physical speed in a summer device. Any resulting error signal is employed in a conventional fuel control to adjust fuel flow until the error signal becomes zero.

BRIEF DESCRIPTION OF THE DRAWING

While the specification concludes with claims particularly pointing out and distinctly claiming the subject matter which is regarded as part of the present invention, it is believed that the invention will be more fully understood from the following description of the preferred embodiment which is given by way of example with the accompanying drawing which is a schematic illustration of the preferred embodiment of the present invention as applied to a gas turbofan engine.

DESCRIPTION OF THE PREFERRED EMBODIMENT

Referring to FIG. 1 wherein like numerals correspond to like elements throughout, the invention is diagrammatically shown at 10 as incorporated in a control apparatus of a gas turbofan engine depicted generally at 12. While such a gas turbine engine is by now well known in the art, a brief description of its operation may be enlightening in view of the discussion to follow. Briefly, this engine may be considered as comprising a core engine 14, a fan 16 and a fan turbine 18 which is interconnected to the fan 16 by shaft 20. The core engine 14 includes an axial flow compressor 22 having a rotor 24. Air enters inlet 26 and is initially compressed by fan 16. A first portion of this compressed air enters the fan bypass duct 28 defined, in part, by core engine 14 and a circumscribing fan nacelle 30 and discharges through a fan nozzle 32. A second portion of the compressed air enters inlet 34, is further compressed by the axial flow compressor 22 and then is discharged to a combustor 36 where fuel is burned to provide high energy combustion gases which drive a turbine 38. This turbine 38, in turn, drives the rotor 24 through a shaft 40 in the usual manner of a gas turbojet engine. The hot gases of combustion then pass through and drive the fan turbine 18 which, in turn, drives the fan 16. A propulsive force is thus obtained by the action of the fan 16 discharging air from the fan bypass duct 28 through the fan nozzle 32 and by the discharge of combustion gases from a core engine nozzle 42 defined, in part, by plug 44. The above description is typical of many present-day gas turbine engines and is not meant to be limiting, as it will become readily apparent from the following description that the present invention is capable of application to any gas turbine engine and is not necessarily restricted to gas turbofan engines of this particular configuration. The foregoing description of the operation of the engine depicted in the Figure is, therefore, merely meant to be illustrative of one type of application for the present invention.

It is contemplated by the present invention to control the propulsive thrust generated by engine 12 through modulation of the speed of compressor 22 of core engine 14 by ultimately controlling the fuel flow into combustor 36. A fuel control apparatus 46 functions to selectively inject fuel into combustor 36 initially as a function of pilot input through positioning of power lever 48. However, it is contemplated by the present invention that particular power ratings of engine 12 will be located at substantially fixed positions of the power lever irrespective of changes in engine inlet temperature, altitude and Mach number with provisions being incorporated to prevent severe overtemperature (due to pilot error) by substantially limiting the temperature of turbine 38 if and when necessary.

Before discussing the operation of control apparatus 10 and how it is applied to satisfy the stated objectives of the present invention, let us first proceed to discuss the choice of control parameters and how they are developed. As stated previously, core engine rotational speed is the preferred control parameter since it is already required for transient engine control and a simpler, less expensive control system is produced when the same parameter is used to control transient and steady-state operation. However, the prior difficulty in utilizing core engine rotational speed was that this speed, when corrected with core inlet (34) temperature to the square root power of $\theta$, was not conducive to flat-rated thrust control under all ambient operating conditions, including rain ingestion.

Application of the present invention requires that control schedules be designed which match the unique performance characteristics of the engine. In other words, every model of gas turbofan engine is different, each having components with unique performance characteristics, and these differences can be accounted for in the development of the control apparatus 10 of the present invention. The approach utilized herein relies upon a comprehensive mathematical model of the engine. It has long been the practice of gas turbine engine manufacturers to develop such models in the form of computer programs in order to predict engine performance, these models being updated as necessary to reflect the results of engine or component testing. In essence, these computer models comprise an interconnected system of known or anticipated component models (such as, for example, fan, compressor and turbine performance maps). Through manipulation of the model, parametric studies can be conducted in order to determine the operation of one or more components of interest when other operating characteristics are manipulated. It is not the intent of the present invention to claim such computer models as the present invention since the development of such models is a long established practice in the industry. Suffice to say that such models have been developed in the past and will continue to be developed for future engines utilizing conventional state-of-the-art computer programming techniques.

The mathematical model of the engine is used in designing control schedules by simulating engine perfomance at the predetermined thrust and turbine temperature levels at which the engine has been or will be rated. The flat thrust rating for the engine is determined as that thrust which is generated when the model is run at the design level of core engine turbine temperature and at a predetermined ambient engine inlet temperature ($T_2$), hereinafter referred to as the "corner point day", which will usually be hotter than standard day $T_2$ temperature. The model is run to simulate flat rated thrust (as derived from the design turbine temperature at sea level on a corner point day) at a series of lower ambient engine inlet temperatures down to the lowest inlet temperature expected to be encountered in service. Other simulations are made at ambient temperatures above the corner point using design turbine temperature as a parameter in place of thrust, and the resulting engine thrust levels less than the flat-rated value are accepted. Model data from these simulations is used to design three of the control function schedules depicted in the Figure.

Using results from the mathematical model for sea level standard day conditions and rated thrust, a single value is calculated for the core speed $N_{2K}$ (using Equation 2 and model results for $N_2$ and $T_2$). In this unique case, engine inlet temperature equals 518.7° R and $\theta$ equals 1.0. Therefore, the core corrected speed equals the measured core physical speed regardless of the power of $\theta$. The desired values for $\theta$ at all other $T_2$ temperatures below corner point may then be calculated using this value of $N_{2K}$ at these other temperatures using the following rearranged version of Equation 2:

$$n = \frac{\log\left(\frac{N_2}{N_{2K}}\right)}{\log\left(\frac{T_2}{518.7}\right)} \qquad \text{Equation 3}$$

The n values for $T_2$ exceeding the corner point are not particularly important, and the n for corner point can be used. From these values of n, a correction factor $Z_1$ may be calculated from the following relationship:

$$Z_1 = \left(\frac{T_2}{518.7}\right)^n \qquad \text{Equation 4}$$

Thus, $Z_1$ is a correction factor for relating physical core speed and corrected core speed at engine inlet temperatures other than 518.7° R for a particular engine model. The calculations are all done at sea level engine inlet pressure and n is frozen for all altitudes. This relationship between $Z_1$ and $T_2$ is incorporated into function generator 50 of the Figure where $Z_1$ is a function of $T_2$. Item 50, therefore, represents a function generator having a cam or mechanical linkage system responsive to $T_2$ which produces a signal proportional to $Z_1$. As used in this application the term signal may denote physical indicia such as mechanical linkage movement, or the like, or electrical indicia such as voltage and/or current.

The schedule for function generator 52 is designed after the schedule for $Z_1$ is determined. This schedule is active only for $T_2$ higher than the corner point. Therefore, takeoff power data is obtained using the mathematical model at several levels of $T_2$ and altitude where the turbine temperature is the power constraint (i.e., the design turbine temperature is the power parameter input to the model). The design temperature may be input as a function of altitude or engine inlet pressure if the engine is to be rated in this manner. Data from the model for $N_2$ and $T_2$ are used to calculate $N_{2K}'$ values (i.e., $N_{2K}'$ equals $N_2/Z_1$) using the n value as determined above (n may be the value calculated for corner point $T_2$ at sea level). $N_{2K}'$ values are plotted as a function of $T_2$ to describe the schedule for function generator 52.

The next step for developing the required parametric relationships relates to item 56 which represents a function generator incorporating a schedule for producing a thrust lapse rate as a function of altitude and comprises a means for generating a corrected speed bias signal ($\Delta N_{2K}''$) as a unique function of engine inlet pressure imposed for turbine overtemperature protection. This $\Delta N_{2K}''$ schedule typically results from negotiations between the engine manufacturer and the aircraft customer and reflects the fact that the thrust capability of a gas turbine engine tends to decline in direct proportion to atmosphere density (which is inversely proportional to altitude). This trend is counter to the objective of maintaining a constant aircraft thrust-to-weight ratio at all altitudes so that it would appear desirable to push the throttle in order to recover this lost thrust. However, due to turbine life considerations and other economic and maintenance factors, a compromise schedule such as that represented by function generator 56 is provided to incrementally change core corrected speed in a predetermined fashion acceptable to both the engine user and manufacturer.

The schedule for function generator 56 is designed using mathematical model data. A design procedure which has been used is described as follows:

a. Select several altitudes within the range of required takeoff altitudes and determine the maximum $T_2$ values (for each of these altitudes) at which the takeoff thrust is flat rated (corner point $T_2$ values).

b. Operate the mathematical model at these altitudes and $T_2$ values using the design values for turbine temperature which correspond to these altitudes. Flight speeds are either zero or the design flight speed.

c. Using the model values for $N_2$ and $T_2$, calculate the $(N_2/\theta^n)$ values for each of these cases.

d. Plot these corrected speeds as a function of the engine inlet pressure, and draw a schedule line or curve which is a satisfactory representation of this plot (this is the desired schedule for takeoff power, but a design compromise must yet be determined which includes maximum climb power).

e. Repeat the general procedure of steps (a) through (d) for maximum climb power. At each of the climb altitudes over the climb range, operate the model at the design flight speed, the maximum climb corner point $T_2$, and the maximum climb design values for turbine temperature (lower values of turbine temperature than for takeoff power).

f. Compare the takeoff and maximum climb schedules and select the corrected speed ($n_{2K}$) difference which best collapses the data for takeoff and maximum climb. The best $N_{2K}$ difference is influenced by the engine application and design objectives. The difference in corrected speeds is a power lever difference and is included in the schedule of function generator 54. The collapsed schedule of $N_{2K}$ as a function of inlet pressure becomes a subtractor or an adder (according to the designer's preference) to the power lever schedule. The amount of the subtractor is zero at the highest altitude which is of concern, and the amount subtracted is largest at the lowest altitude which is of concern.

The schedule for function generator 54 is designed using mathematical model data for a series of cases with thrust varying from idle to full takeoff. These cases are usually run for sea level on a standard day with zero aircraft velocity. The schedule curve 54 is designed for linear thrust using techniques familiar to those skilled in the art. The subtractor schedule value(s) for inlet pressure are added to model $N_{2K}$ values to obtain schedule 54 values of $N_{2K}''$.

Continuing to refer to the Figure, the functional operation of the thrust controlling apparatus of the present invention will now be described in greater particularity. Engine thrust level is set by the pilot through power lever 48 which actuates a means such as function generator 54 for producing a first demand compressor corrected speed signal $N_{2K}''$ proportional to core compressor physical speed divided by $\theta$ to the n power. This function generator, which may be a mechanical cam, electrical function generator, or equivalent device, acts to generate the function $N_{2K}''$ as a function of PLA in the manner described hereinabove.

Engine inlet pressure $P_2$ is determined by sensor 58 which communicates with the engine inlet or a pitot probe mounted outside the engine in general alignment with the incoming engine airflow by line 60, and actuates a means such as function generator 56 for providing the incremental changes in corrected speed signal $\Delta N_{2K}''$ of such a magnitude to provide the rated changes in thrust as functions of altitude and Mach number. Function generator 56 may also be a mechanical cam, linkage or equivalent device. The base corrected speed signal $N_{2K}''$ and the pressure-biased incremental corrected speed $\Delta N_{2K}''$ are fed into a summer device 62 to establish the flat rated corrected speed demand. Thus, function generator 56 and summer 62 comprise a means for biasing the first demand compressor corrected speed at a predetermined lapse rate to produce a flat-rated corrected speed demand.

Contemporaneously, the ram air temperature $T_2$ at the inlet to the engine is determined by sensor 64 which communicates with the engine inlet by way of line 66 and which may comprise a standard temperature measuring device operating on the confined gas pressure operating principle. Sensor 64 actuates means such as function generator 50 for producing a signal proportional to the correction factor $Z_1$. This function generator 50, which again may comprise a mechanical cam, linkage or electrical function generator, acts to generate the correction factor $Z_1$ as a function $T_2$ in the manner described hereinabove. $T_2$ sensor 64 also actuates the other means such as function generator 52 to produce a second signal proportional to the upper limit corrected speed $N_{2K}'$ as calculated for turbine (38) temperature-limiting on hot days where $T_2$ exceeds that for the flat thrust rating (i.e., in excess of corner point day). Function generator 52 also comprises a mechanical cam, linkage or electrical function generator to produce its signal in the manner hereinabove described.

The upper limit corrected speed $N_{2K}'$ and flat-rated corrected speed demand are fed to means such as select lesser device 68 through lines 70 and 72, respectively, wherein the smaller of the two corrected speed signals is selected and fed to a multiplier 74 by way of line 76. As was described hereinabove, correction factor $Z_1$ comprises a means for relating physical core engine compressor speed and corrected core engine compressor speed at engine inlet temperatures, $T_2$, other than standard day. Therefore, $Z_1$ is fed to means such as multiplier 74 by line 78 wherein it is applied with the selected corrected demand speed signal from the select lesser device 68 with the resulting product comprising the reference or demand physical speed signal for the core engine.

Actual core engine rotational speed $N_2$ is determined by sensor 80 which communicates with the core engine compressor rotor via line 82. The physical speed is sent to fuel control 46 by line 83 in the usual manner of gas turbine engine controls. In addition, the demand physical speed and the actual physical speed are fed to a summer 84 by lines 86 and 88, respectively, where they are compared, with the resulting speed error being sent to fuel control 46 by line 90 to adjust the fuel flow to combustor 36 via line 92 until the error signal becomes zero.

The invention as described hereinabove, unlike the prior art systems which rely on core engine speed, provides good and consistent throttle thrust characteristics over the entire range of operating conditions. The invention uses core engine speed corrected to fan inlet temperature and thereby avoids thrust control problems due to rain ingestion inherent in any control which uses speed corrected to compressor inlet temperature. Further, engine power is automatically managed so that the power lever settings for maximum power always occurs near the full-rated throttle angle position and other power ratings more closely approximate fixed positions on the PLA scale.

It should be obvious to one skilled in the art that certain changes can be made to the above-described invention without departing from the broad, inventive concepts thereof. For example, since pressure at the discharge of compressor 22 can be correlated with engine inlet pressure $P_2$, the present invention could utilize such pressure being fed by a line 94 to pressure sensor 58. It is intended that the appended claims cover this and all other variations in the present invention's broader inventive concepts.

Having thus described the invention, what is claimed as novel and desired to be secured by Letters Patent of the United States is:

We claim:

1. Apparatus for controlling thrust of a gas turbine engine of the type having a compressor, a combustor and a turbine with means for producing signals proportional to engine inlet temperature, engine inlet pressure and comproessor physical rotational speed, a fuel controller, and a power lever adapted to be set to different angles to select a different desired engine thrust at each power lever angle, wherein the improvement comprises means for providing a demand compressor physical speed signal adjusted by engine inlet pressure and temperature wherein said means for providing a demand compressor physical speed signal comprises means for producing a first demand compressor corrected speed signal as a function of the selected power lever angle, said last recited signal being further proportional to compressor physical speed divided by $\theta^n$, wherein n is that exponent which provides flat-rated thrust independent of engine inlet temperature for those inlet temperatures which are below a preselected flat-rating inlet temperature, means for comparing said compressor physical speed signal and said demand compressor physical speed signal to develop an error signal, said error signal being coupled to said fuel controller in order to maintain said desired thrust at each selected power lever angle.

2. The apparatus as recited in claim 1 wherein said means for providing a demand compressor physical speed signal comprises means for producing a demand compressor corrected speed signal as a function of power lever angle, means for providing a predetermined inlet pressure lapse rate signal which provides a predetermined thrust rating schedule which varies with altitude, and means for biasing said demand compressor corrected speed signal with said lapse rate signal.

3. The apparatus as recited in claim 1 wherein said means for providing a demand compressor physical speed signal further comprises means for biasing the first demand compressor corrected speed at a predetermined lapse rate as a function of engine inlet pressure to produce a flat-rated demand corrected speed signal which increases with altitude.

4. The apparatus as recited in claim 3 wherein said means for providing a demand compressor physical speed signal further comprises means for producing a second demand compressor corrected speed signal as a function of engine inlet temperature resulting in a predetermined maximum level of turbine temperature.

5. The apparatus as recited in claim 4 wherein said means for providing a demand compressor physical speed signal further comprises means for selecting the lesser quantity of said flat-rated demand compressor corrected speed signal and said second demand compressor corrected speed signal, means for producing a signal proportional to a temperature correction factor as a function of engine inlet temperature which relates compressor physical speed and compressor corrected speed at engine inlet temperatures other than sea level standard day temperatures, and means for applying said selected lesser compressor corrected speed signal and said temperature correction factor to produce a demand compressor physical speed signal as a function thereof.

6. Apparatus for controlling thrust of a gas turbine engine of the type having a compressor, a combustor and a turbine with means for producing signals proportional to engine inlet temperature, engine inlet pressure and compressor physical rotational speed, a fuel controller, and a power lever adapted to be set to different angles to select a different desired engine thrust at each power lever angle, wherein the improvement comprises means for providing a demand compressor physical speed signal adjusted by engine inlet pressure and temperature, means for comparing said compressor physical speed signal and said demand compressor physical speed signal to develop an error signal, said error signal being coupled to said fuel controller in order to maintain said desired thrust at each selected power lever angle wherein said means for providing a demand compressor physical speed signal comprises means for producing a temperature correction factor signal as a function of engine inlet temperature which relates compressor physical speed and compressor corrected speed at engine inlet temperatures other than sea level standard day temperature, means for producing a demand compressor corrected speed signal as a function of power lever position and biased by a predetermined lapse rate as a function of engine inlet pressure, means for producing a separate demand compressor corrected speed signal as a function of engine inlet temperature, means for selecting the lesser of the two demand compressor corrected speed signals and means for applying said selected lesser corrected speed signal and said temperature correction factor to produce a demand compressor physical speed signal as a function thereof.

7. The apparatus as recited in claim 1 wherein said means for producing signals proportional to engine inlet temperature comprises a temperature sensor.

8. The apparatus as recited in claim 1 wherein said means for producing signals proportional to engine inlet pressure comprises a pressure sensor at the inlet to the engine.

9. The apparatus as recited in claim 1 wherein said means for producing signals proportional to engine inlet pressure comprises a pressure sensor at the discharge from said compressor.

10. The apparatus as recited in claim 3 wherein said means for providing a demand compressor physical speed signal further comprises means for limiting said flat-rated demand corrected speed signal as a function of engine inlet temperature to protect against turbine overtemperature when the engine inlet temperature exceeds flat thrust rating point.

11. In a gas turbine engine of the type having a compressor, a combustor, a turbine, a fuel controller, and a power lever adapted to be variably positioned to select engine thrust, a method of controlling thrust for varying values of engine inlet pressure and temperature comprising the steps of:

producing signals respectively proportional to engine inlet temperature, engine inlet pressure and power lever position;

producing a temperature correction factor proportional to engine inlet temperature which related compressor physical speed and compressor corrected speed at engine inlet temperatures other than standard day temperature;

producing a demand compressor corrected speed proportional to a selected power level position and biased by a predetermined lapse rate proportional to engine inlet pressure;

producing a separate demand compressor corrected speed proportional to engine inlet temperature;

selecting the lesser of the two demand compressor corrected speeds;

applying the selected lesser speed and the temperature correction factor to produce a demand compressor physical speed as a function thereof; and applying said signals to said fuel controller to automatically adjust compressor physical rotational speed at a fixed power lever position, whereby a selected thrust level is maintained at varying engine inlet temperatures within limits imposed for turbine overtemperature protection and compressor physical speed is modulated with variations in engine inlet pressure to provide a thrust rating schedule which varies with altitude.

12. In the method of controlling thrust in a gas turbine engine as recited in claim 11, the step of modulating compressor physical speed to substantially match the demand compressor physical speed.

* * * * *